No. 869,182. PATENTED OCT. 22, 1907.
J. V. HOTCHKISS.
CROSSCUT SAW.
APPLICATION FILED JAN. 29, 1907.

Witnesses
Inventor
J. V. Hotchkiss
by H. B. Willson & Co.
Attorneys

UNITED STATES PATENT OFFICE.

JOSEPH V. HOTCHKISS, OF WEBSTER CITY, IOWA, ASSIGNOR OF ONE-HALF TO CHRISTIAN F. W. BUENTE, OF WEBSTER CITY, IOWA.

CROSSCUT-SAW.

No. 869,182.　　　　Specification of Letters Patent.　　　　Patented Oct. 22, 1907.

Application filed January 29, 1907. Serial No. 354,709.

*To all whom it may concern:*

Be it known that I, JOSEPH V. HOTCHKISS, a citizen of the United States, residing at Webster City, in the county of Hamilton and State of Iowa, have invented certain new and useful Improvements in Crosscut-Saws; and I do declare the following to be a full, clear, and exact description of the invention, such as will enable others skilled in the art to which it appertains to make and use the same.

This invention relates to improvements in cross cut saws.

The object of the invention is to provide a saw of this character the teeth of which are so formed and arranged that the saw may be run easily and rapidly and whereby a smooth clean kerf will be formed.

A further object is to provide a cross cut saw which may be easily kept in order, the teeth being so constructed and arranged that the wear on the same is reduced to a minimum.

With the above and other objects in view, the invention consists of certain novel features of construction, combination and arrangement of parts, as will be hereinafter described and claimed.

Figure 1:
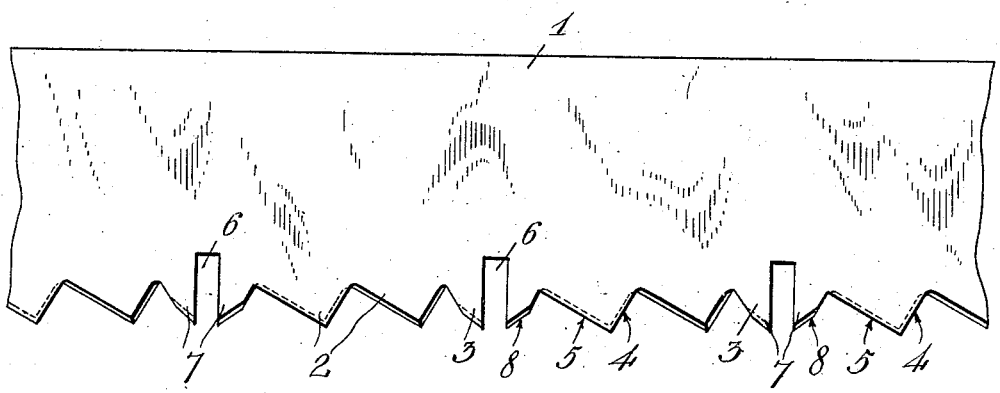
Figure 2:
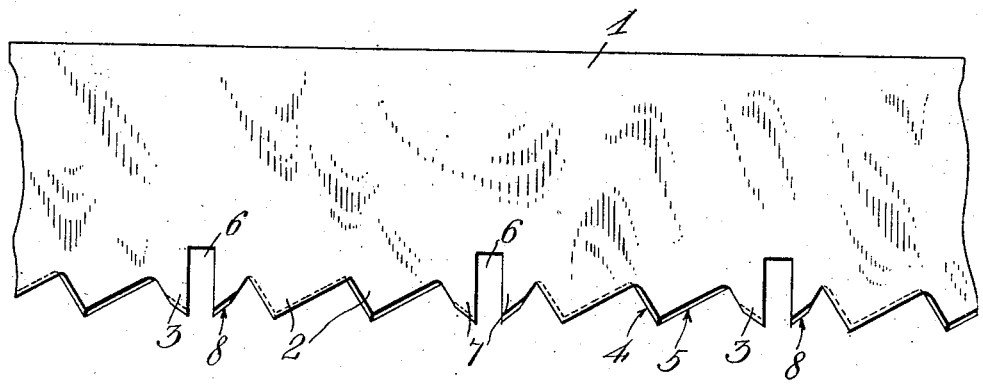

In the accompanying drawings:—Figure 1 is a side view of one side of a portion of the saw; and Fig. 2 is a similar view of the opposite side.

Referring more particularly to the drawings, 1 denotes a section of the saw blade, to the ends of which are adapted to be applied the usual or any desired form of handle (not shown).

One edge of the saw blade is provided with a series of teeth, which are so constructed and arranged as to greatly facilitate the operation of the saw. The teeth, as here shown consist of a series of cutting teeth 2 and a series of combined raker and cutting teeth 3. The cutting teeth 2 are arranged between the combined cutting and raking teeth 3, there being preferably two cutting teeth between each two of the combined teeth, as shown. The cutting teeth 2 are in the form of an obtuse angle, the forward edge 4 of which is the shorter or more abrupt while the rear edge 5 has a gradual inclination. The edges of the teeth 2 in each pair are beveled in opposite directions so that when the saw is operated one tooth of each pair will cut one side of the kerf while the other tooth of each pair will cut the opposite side of the kerf, as will be understood.

The combined cutting and raking teeth 3 are arranged between the pairs of cutting teeth 2, as shown. The inner edges of said teeth 3 are square or at right angles to the length of the saw and are formed by providing a rectangular recess or notch 6 in the saw blade between the teeth. The inner edges of the teeth 3 formed by the side walls of the notches 6 constitute the raking portions of said teeth and the points 7 of said inner edges of these teeth, rake out and form the bottom of the kerf and also remove the sawdust and chips from the kerf. The outer edges 8 of the combined teeth 3 at opposite sides of the notches 6 incline in opposite directions and connect with the inner ends of the cutting teeth and said inclined outer edges are beveled in relatively reverse directions and form the cutting portions of said combined teeth.

A saw having teeth formed and arranged as herein shown and described may be easily kept in order and will be found to wear less and to work more easily because of the fact that the cutting is done on the sides of the kerf by the inclined oppositely-beveled edges of both the cutting teeth 2 and the combined teeth 3 while the bottom of the kerf is raked out by the raking portion of said combined teeth 3 which also keep the kerf clean and free from accumulations of sawdust.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A saw blade having obtuse angular cutting teeth arranged in pairs and having all the sides thereof slanting in one direction, of a greater slant than the sides slanting in the other direction, and pairs of oppositely disposed combined cutting and raking teeth alternating with said pairs of cutting teeth separated from each other by relatively deep notches, the sides of said notches being disposed perpendicularly to the axial line of the saw blade and also perpendicular to the flat faces of said saw blade, the cutting edges of the combined cutting and raking teeth being laterally beveled in relatively reverse directions and the cutting edges of the cutting teeth being also laterally beveled in relatively reverse directions.

2. A saw blade having obtuse angular cutting teeth arranged in pairs and having all of the sides thereof slanting in one direction, of a greater slant than the sides slanting in the opposite direction, pairs of combined cutting and raking teeth alternating with said pairs of cutting teeth, the extreme outside sides being of equal and opposite slant, and relatively deep notches separating the teeth of said pairs of combined cutting and raking teeth, the side faces thereof being perpendicular to both the axial line of the saw blade and the flat faces thereof, the cutting edges of the combined cutting and raking teeth being laterally beveled in relatively reverse directions and the edges of the cutting teeth being also laterally beveled in relatively reverse directions.

In testimony whereof I have hereunto set my hand in presence of two subscribing witnesses.

JOSEPH V. HOTCHKISS.

Witnesses:
G. F. TUCKER,
WM. SARGENT.